United States Patent
Takahashi

(10) Patent No.: US 7,991,144 B2
(45) Date of Patent: Aug. 2, 2011

(54) VOICE COMMUNICATION TERMINAL

(75) Inventor: Junichi Takahashi, Hamura (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1173 days.

(21) Appl. No.: 11/724,935

(22) Filed: Mar. 16, 2007

(65) Prior Publication Data

US 2008/0226053 A1 Sep. 18, 2008

(51) Int. Cl.
*H04M 3/00* (2006.01)
*H04M 5/00* (2006.01)

(52) U.S. Cl. ........................................ 379/258
(58) Field of Classification Search ............ 379/258
See application file for complete search history.

(56) References Cited

U.S. PATENT DOCUMENTS

2006/0160531 A1* 7/2006 Park et al. .............. 455/418

FOREIGN PATENT DOCUMENTS

JP 2004-304374 A 10/2004

* cited by examiner

*Primary Examiner* — Alexander Jamal
(74) *Attorney, Agent, or Firm* — Maschoff Gilmore & Israelsen

(57) ABSTRACT

When an outgoing call is to be requested on a terminal, the terminal transmits a first outgoing call request containing the priority of outgoing call operation. When the terminal transmits the first outgoing call request, and then receives a second outgoing call request addressed to the terminal before it receives an incoming call response with respect to the first outgoing call request from a destination terminal, the terminal compares the priority contained in the second outgoing call request with the priority contained in the first outgoing call request. The terminal executes an incoming call response procedure corresponding to the second outgoing call request when the priority in the second outgoing call request is higher as the result of comparison between the priorities of outgoing call operation, and executes a outgoing call control following the first outgoing call request when the priority in the first outgoing call request is higher.

15 Claims, 9 Drawing Sheets

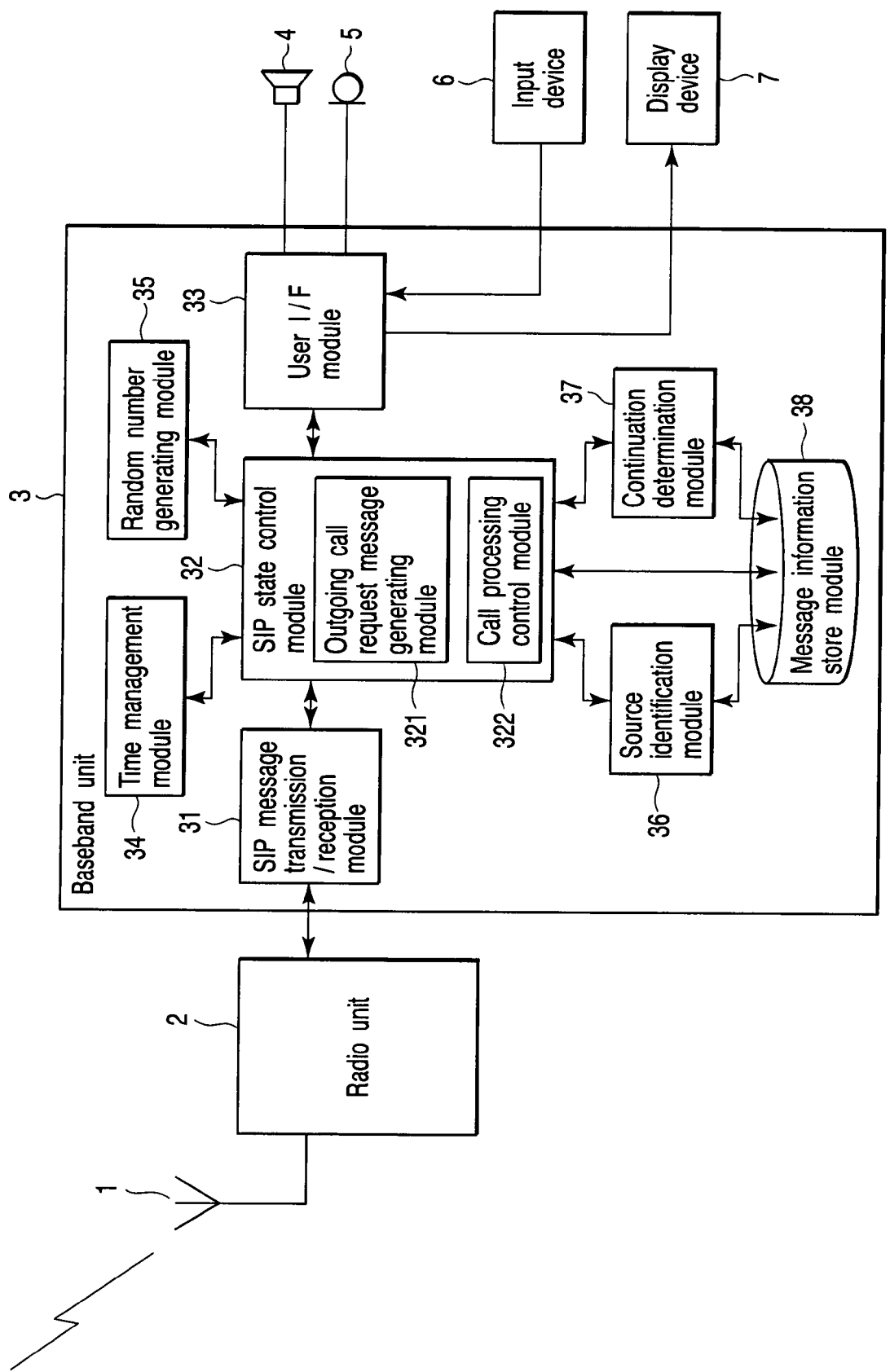
F I G. 2

Example of INVITE message header

```
INVITE tel : + 81 - 11 - 222 - 3333 SIP / 2.0
Via : SIP / 2.0 / UDP 111.222.112.233:1357; comp = sigcomp; branch = z9hG4bKnashds7
Max - Forwards : 70
Route : <sip : pcscf.xxx.com : 2468; lr; comp = sigcomp>, <sip : scscf.yyy.com; lr>
P - Preferred - Identity : "John Doe" <sip : user@zzz.com>
Privacy : none
From : <sip : user@zzz.com>; tag = 162738
To : <tel : + 81 - 11 - 222 - 3333>
Call - ID : cb03a0s09a2sdfglkj490333
Cseq : 123INVITE
Require : precondition, aec - agree
Proxy - Require : sec - agree
Supported : 100rel
Contact : <sip : 111.222.112.23 : 1357; comp = sigcomp>
Allow : INVITE, ACK, CANCEL, BYE, PRACK, UPDATE, REFER, MESSAGE
Date : Sat, 28 May 2005 14 : 25 : 00 GMT       TM
Call - Rand :1839                              RN
Content - Type : application / sdp
Content - Length : ( ··· )
```

FIG. 4

Call establishment sequence (when both client terminals have transmitted outgoing calls)

Call establishment sequence (without call processing continuation determination)

VOICE COMMUNICATION TERMINAL

BACKGROUND OF THE INVENTION

1. Field of the Invention

The present invention relates to a voice communication terminal which establishes a session and performs voice communication with a communication partner terminal through a packet switching network.

2. Description of the Related Art

Recently, various communication services have been provided by using IP (Internet Protocol) networks typified by the Internet. Such services include an IP telephone service using SIP (Session Initiation Protocol) as a call control protocol. The IP telephone service using SIP makes a source terminal transmit first an INVITE message as an outgoing call request message to a destination terminal. In response to this request message, the destination terminal (terminating terminal) returns an INVITE response message (status code 180 Ringing) if the destination terminal is in the standby state. Subsequently, this service executes a predetermined procedure to establish a session between the source terminal and the destination terminal, and allows the two terminals to make telephone speech between them upon establishment of a session. If the destination terminal is not in the standby state, the destination terminal transmits a response message containing the state to the source terminal. If, for example, the destination terminal is in the calling state, the terminal returns an INVITE response message (status code 486 Busy Here) indicating that the destination terminal is busy. For example, Jpn. Pat. Appln. KOKAI Publication No. 2004-304374 or Impress standard textbook series "Revised Edition SIP Textbook", supervised by Yasubumi Chimura and Toshifumi Murata, Dec. 11, 2004 describes the details of this call control using SIP.

Assume that using SIP as a call control protocol, two terminals transmit outgoing call request messages (INVITE messages) at almost the same time. In this case, since the terminals are both in the calling state, the terminals return INVITE response messages (status code 486 Busy Here) indicating they are busy to each other. Consequently, the two terminals cannot establish a session with each other and cannot start any telephone speech.

BRIEF SUMMARY OF THE INVENTION

It is an object of the present invention to provide a voice communication terminal which, even when the terminal transmits an outgoing call request message and receives another outgoing call request message from the destination terminal of the transmitted message before receiving a response message, establishes a session without unconditionally changing the state of the terminal to the busy state and allows to make voice communication.

In order to achieve the above object, according to an aspect of the present invention, a voice communication terminal which establishes a session and makes voice communication with another terminal through a packet communication network, creates an outgoing call request message containing the information of source and destination addresses and the priority of the outgoing call control operation when it is to be transmitted. When the terminal transmits an outgoing call request message and receives another outgoing call request message from the destination terminal before receiving a response message, the terminal compares the priority contained in the transmitted call request message with the one contained in the received call request message. If the priority in the received call request message is higher than the one in the transmitted call request message, the terminal executes call control procedures as a callee in response to the received call request message, otherwise executes call control procedures as a caller following the transmitted call request message.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing the arrangement of a voice communication terminal according to an embodiment of the present invention;

FIG. 4 is a view showing the arrangement of the header of an INVITE message generated and transmitted by outgoing call control shown in FIG. 3;

DETAILED DESCRIPTION OF THE INVENTION

Figure 1:
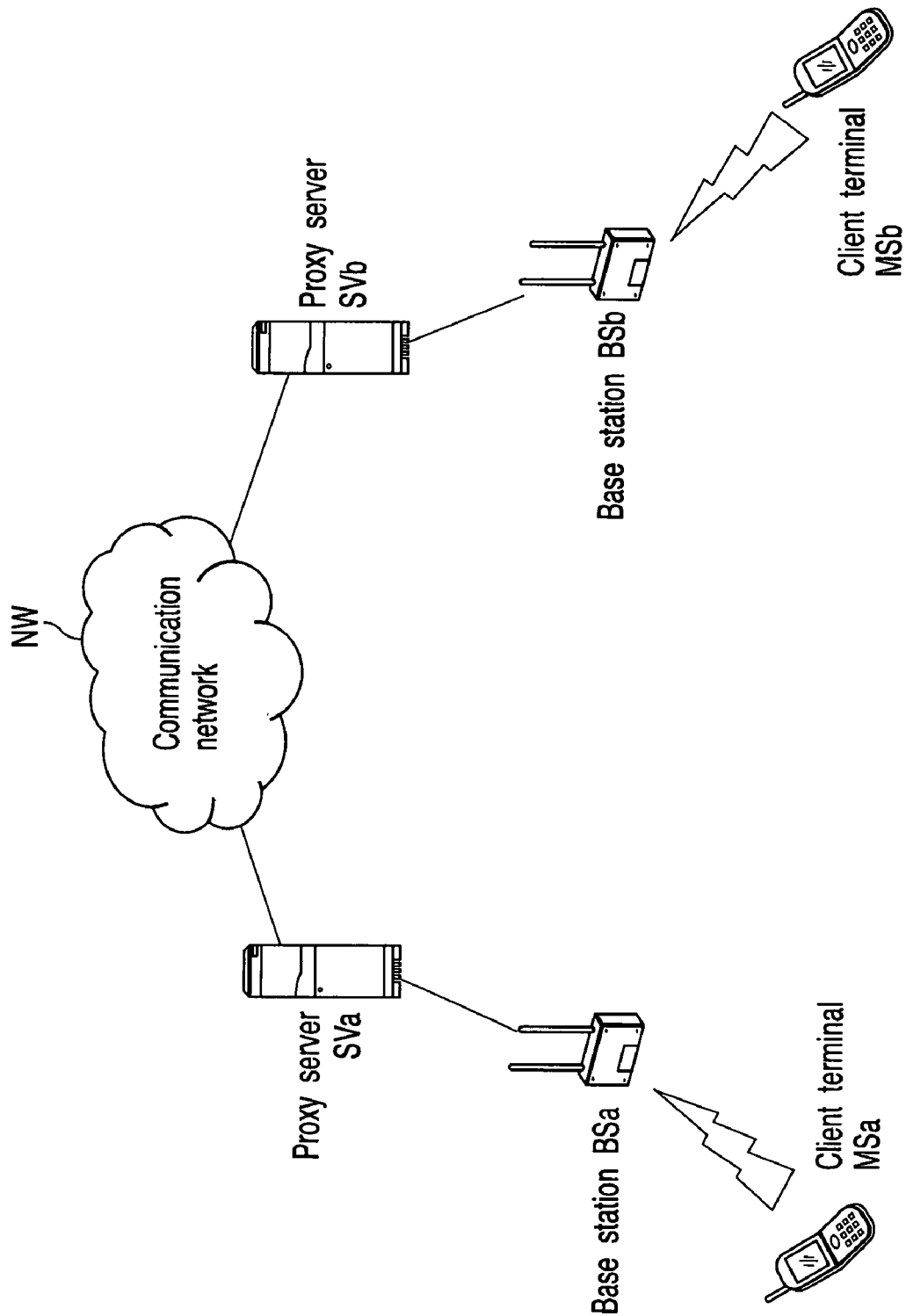
FIG. 1 is a view showing the schematic arrangement of a communication system using a voice communication terminal according to an embodiment of the present invention.

FIG. 1 is a view showing the schematic arrangement of a communication system using a voice communication terminal according to an embodiment of the present invention.

This communication system uses a cellular phone as a voice communication terminal. In a service target area, a plurality of base stations BSa and BSb are distributed. The base stations BSa and BSb form radio areas called cells. Client terminals MSa and MSb existing in these radio areas communicate with each other through a radio channel.

The base stations BSa and BSb connect to proxy servers SVa and SVb through wired lines. The proxy servers SVa and SVb connect to a communication network NW comprising an IP (Internet Protocol) network. The proxy servers SVa and SVb are using SIP (Session Initiation Protocol) as a voice communication protocol. A session is established between the client terminals MSa and MSB through the proxy servers SVa and SVb, and the client terminals MSa and MSb perform voice communication through the session.

Each of the client terminals MSa and MSb has the following arrangement. FIG. 2 is a block diagram showing the arrangement. That is, each of the client terminals MSa and MSb comprises a radio unit 2 including an antenna 1, a baseband unit 3, a loudspeaker 4 and microphone 5 for voice communication, an input device 6, and a display device 7. The input device 6 comprises a dial key and a plurality of function keys. The display device 7 comprises an LCD (Liquid Crystal Device).

The baseband unit 3 comprises, for example, a microcomputer, and also comprises an SIP message transmission/reception module 31, SIP state control module 32, and user interface module (user I/F module) 33. The baseband unit 3 also comprises a time management module 34, random number generating module 35, source identification module 36, continuation determination module 37, and message information store module 38. Note that these functions are implemented by executing application programs on the above microcomputer.

The SIP message transmission/reception module 31 transmits/receives an SIP message to/from the client terminal of a communication partner under the control of the SIP state control module 32. The user I/F module 33 decodes the data of a received voice packet and outputs the decoded voice signal from the loudspeaker 4. The user I/F module 33 also encodes a voice signal input to the microphone 5 and generates a transmission voice packet. In addition, the user I/F module 33 notifies the SIP state control module 32 of data input by the input device 6, and displays display data output from the SIP state control module 32 on the display device 7.

The SIP state control module 32 comprises, as control functions according to the present invention, an outgoing call request message (INVITE message) generating module 321 and a call processing control module 322 which operates when a plurality of outgoing call request messages are congested. When generating an outgoing call request message, the outgoing call request message generating module 321 inserts the outgoing call time generated by the time management module 34 and the random number generated by the random number generating module 35 in the header of the message. The message information store module 38 holds the destination information, outgoing call time, and random number inserted in the header of the outgoing call request message.

The time management module 34 generates an outgoing call time in accordance with a time generation request from the SIP state control module 32. The random number generating module 35 generates a random number in accordance with a request from the SIP state control module 32, and returns the random number to the SIP state control module 32. Note that the time which the time management module 34 generates is synchronized in the system to always set the same time between the client terminals MSa and MSb. For example, updating the time management modules 34 in the client terminals MSa and MSb in accordance with the time information transmitted from a base station makes it possible to always set the same time between the client terminals MSa and MSb.

Assume that the call processing control module 322 of the SIP state control module 32 transmits first the above outgoing call request message (INVITE message) to a given terminal, and then receives an outgoing call request message (INVITE message) from another terminal before receiving an incoming call response message (INVITE response message of status code 180 Ringing) from the given terminal. In this case, the call processing control module 322 executes a different call control procedure on the basis of the source determination result obtained by the source identification module 36 and the determination result obtained by the continuation determination module 37 concerning whether to continue call processing.

The source identification module 36 compares the destination information inserted in the transmitted outgoing call request message (INVITE message) held in the message information store module 38 with the source information inserted in the received outgoing call request message (INVITE message) in accordance with a request from the SIP state control module 32. The source identification module 36 notifies the SIP state control module 32 of the comparison result.

The continuation determination module 37 compares the outgoing call time inserted in the transmitted outgoing call request message (INVITE message) held in the message information store module 38 with the outgoing call time inserted in the received outgoing call request message (INVITE message) in accordance with a request from the SIP state control module 32. The continuation determination module 37 then determines which one of the outgoing call timings of the outgoing call request messages is earlier. Upon determining that the outgoing call times of the respective outgoing call request messages coincide with each other, the continuation determination module 37 compares the random number inserted in the transmitted outgoing call request message (INVITE message) with the random number inserted in the received outgoing call request message (INVITE message). The continuation determination module 37 then determines which one of the random numbers is larger.

Call processing control operation by the client terminals MSa and MSb having the above arrangement will be described next.

(1) Outgoing Call Control

Figure 3:
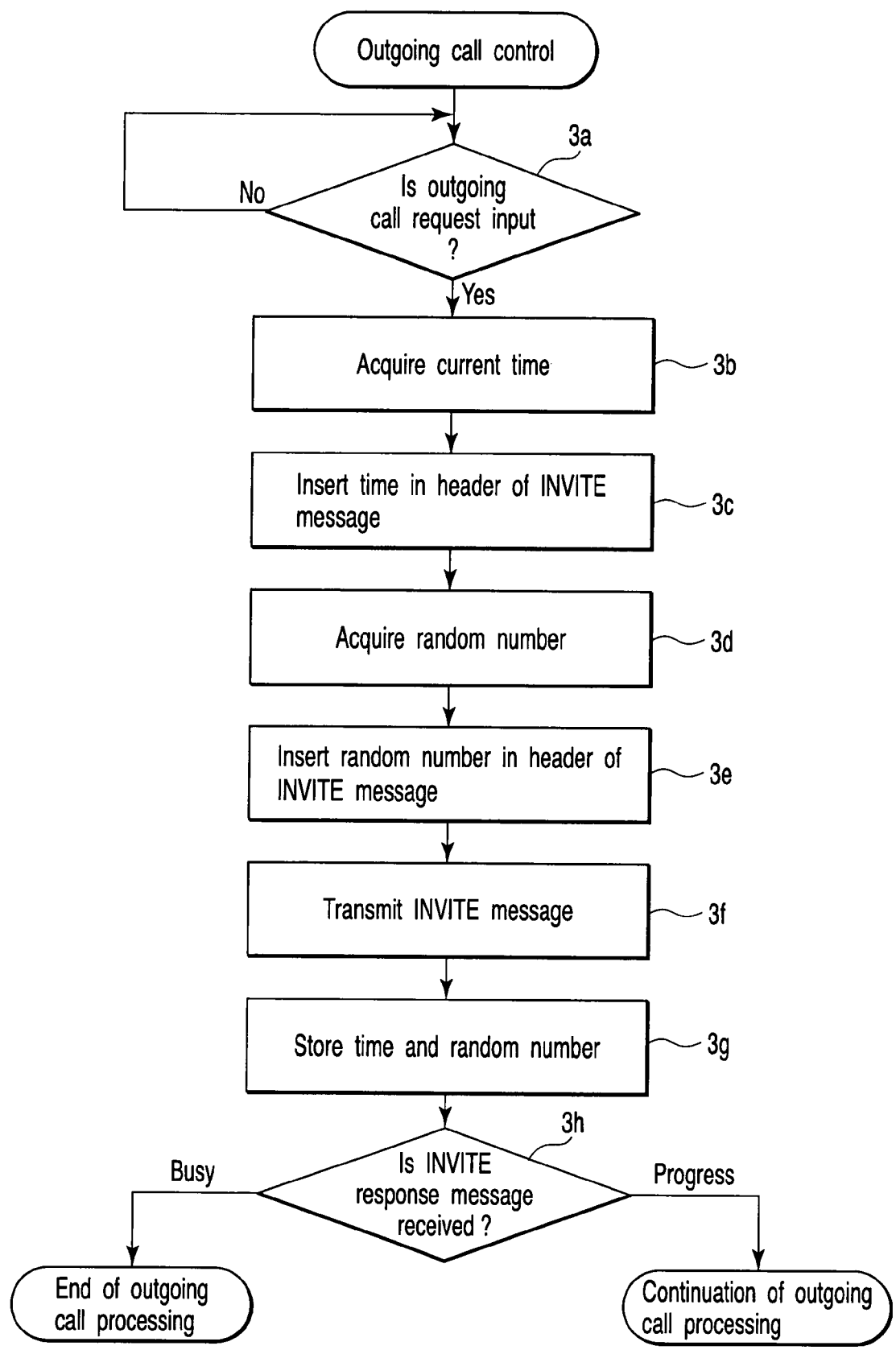
FIG. 3 is a flowchart showing an outgoing call control procedure by the voice communication terminal shown in FIG. 2 and control contents.
Figure 7:
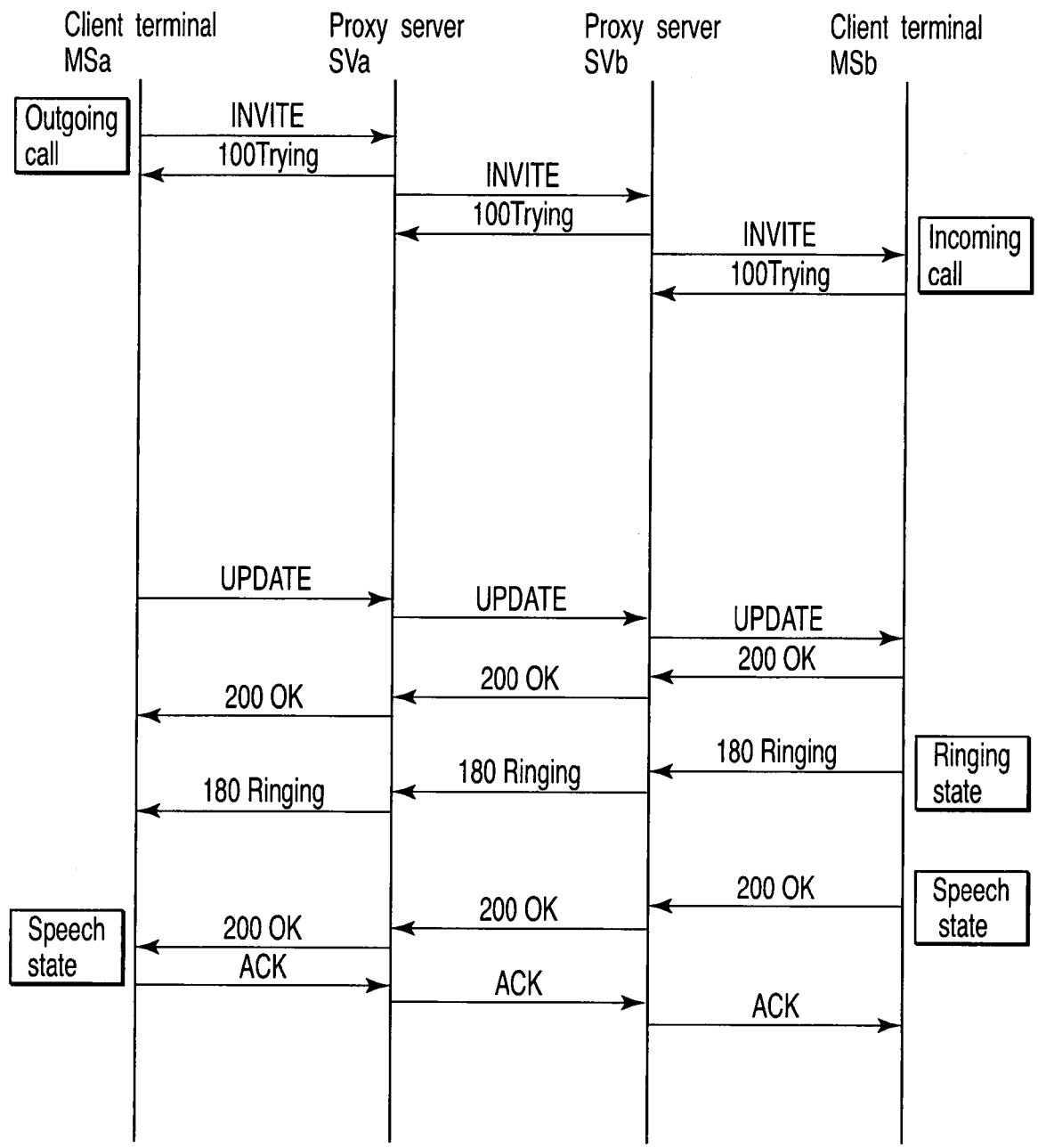
FIG. 7 is a view showing a call establishment sequence in a case wherein one client terminal has transmitted an outgoing call.

Assume that the user has operated the client terminal MSa to transmit an outgoing call request addressed to the client terminal MSb. In this case, the SIP state control module 32 in the client terminal MSa executes outgoing call control operation as follows. FIG. 3 is a flowchart showing a corresponding content control procedure. FIG. 7 shows a call establishment sequence between the client terminal MSa and MSb.

If the input of the above outgoing call request is detected in step 3a, the outgoing call request message generating module 321 in the SIP state control module 32 inserts first the address information of the source and destination terminals in the header of an INVITE message. The process advances to step 3b to acquire the outgoing call time from the time management module 34 and insert the acquired outgoing call time in the Date field of the header of the above INVITE message (step 3c). In addition, the outgoing call request message generating module 321 acquires a random number from the random number generating module 35 in step 3d, and inserts the acquired random number in the Call-Rand field of the header of the above INVITE message (step 3e). The Call-Rand is defined by this invention. FIG. 4 shows an example of the header of the INVITE message in which the above outgoing call time and random number are inserted. Referring to FIG. 4, reference symbol TM denotes an outgoing call time; and RN, a random number.

In step 3f, the outgoing call request message generating module 321 transfers the header information of the INVITE message having the above outgoing call time and random number to the SIP message transmission/reception module 31. The SIP message transmission/reception module 31 generates an INVITE message by inserting the header information of the INVITE message transferred from the SIP state control module 32 before the body of the INVITE message generated separately. The SIP message transmission/reception module 31 forms a packet from the generated INVITE message, and transfers it to the radio unit 2. The radio unit 2 converts the packet of the above INVITE message into a signal form that can be radioly transmitted, and transmits the radio signal from the antenna 1 to the base station BSa.

Finally, in step 3g, the outgoing call request message generating module 321 stores the header information, the above outgoing call time and random number, in the message information store module 38.

When the client terminal MSa transmits the above INVITE message, the proxy servers SVa and SVb and the destination-client terminal MSb, which have received the INVITE message, respectively return a tentative response message (100 Trying) as shown in FIG. 7. If the destination client terminal MSbit is in the standby state, it returns an INVITE response message of status code 180 Ringing as shown in FIG. 7.

Upon receiving the INVITE response message from the destination client terminal MSb, the source client terminal MSa forwards this message through the SIP message transmission/reception module 31 to the SIP state control module 32. The SIP state control module 32 checks if the received message is an INVITE response message of status code 180 Ringing indicating an incoming call response (step 3h). Subsequently the client terminal MSa continues a call establishment procedure with the destination client terminal MSb as shown in FIG. 7. The speech state is set once a session is established as a result of this operation.

If the destination client terminal MSb is in the speech state, it returns an INVITE response message of status code 486 Busy Here indicating the busy state. Upon receiving the INVITE response message, the SIP state control module 32 checks if the message is an INVITE response message of status code 486 Busy Here indicating the busy state in step 3h. Subsequently the source client terminal MSa terminates the outgoing call control operation.

(2) Incoming Call Control

Figure 5:
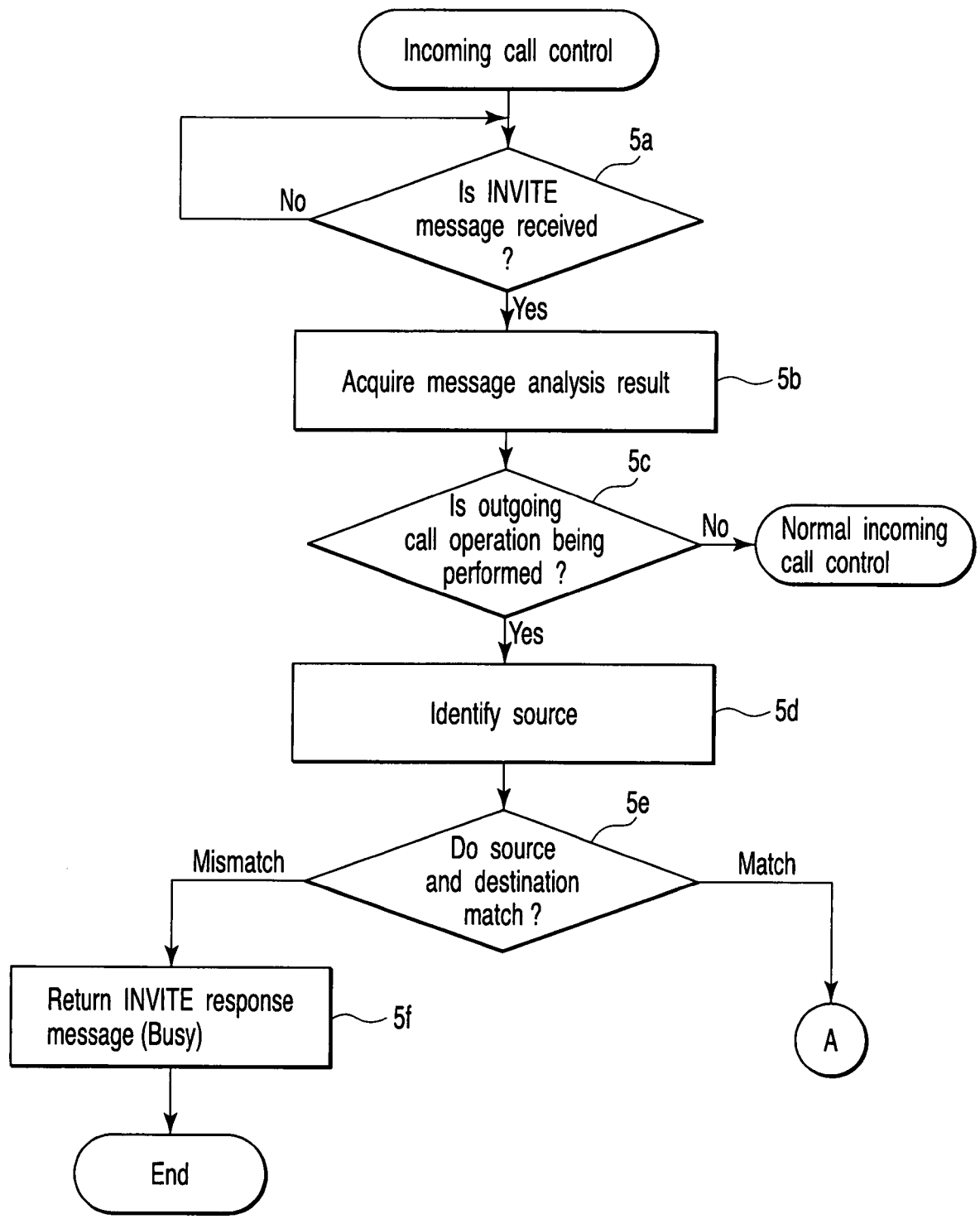
FIG. 5 is a flowchart showing an incoming call control procedure by the voice communication terminal shown in FIG. 2 and the first half part of control contents.
Figure 6:
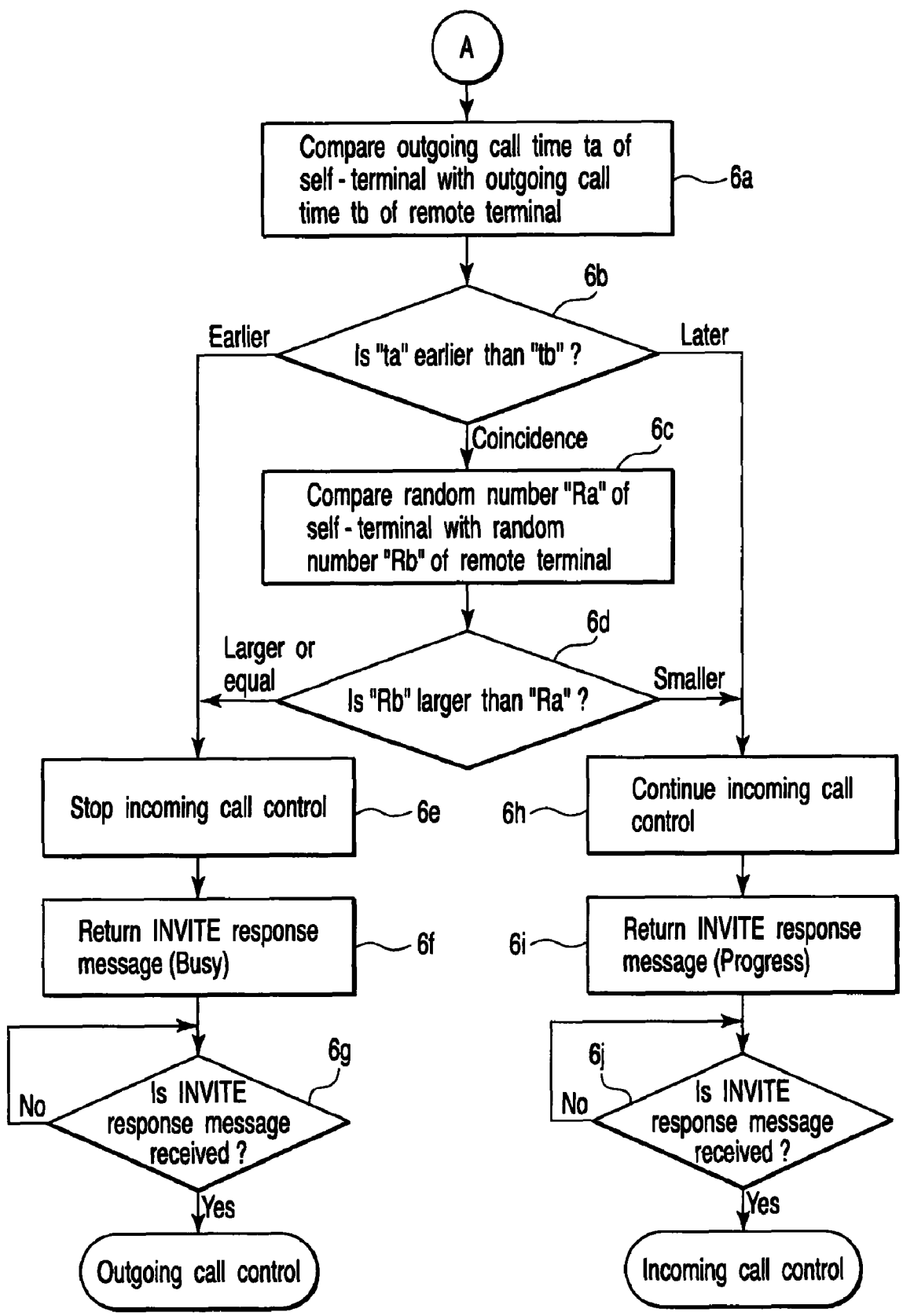
FIG. 6 is a flowchart showing an incoming call control procedure by the voice communication terminal shown in FIG. 2 and the second half part of control contents.
Figure 8:
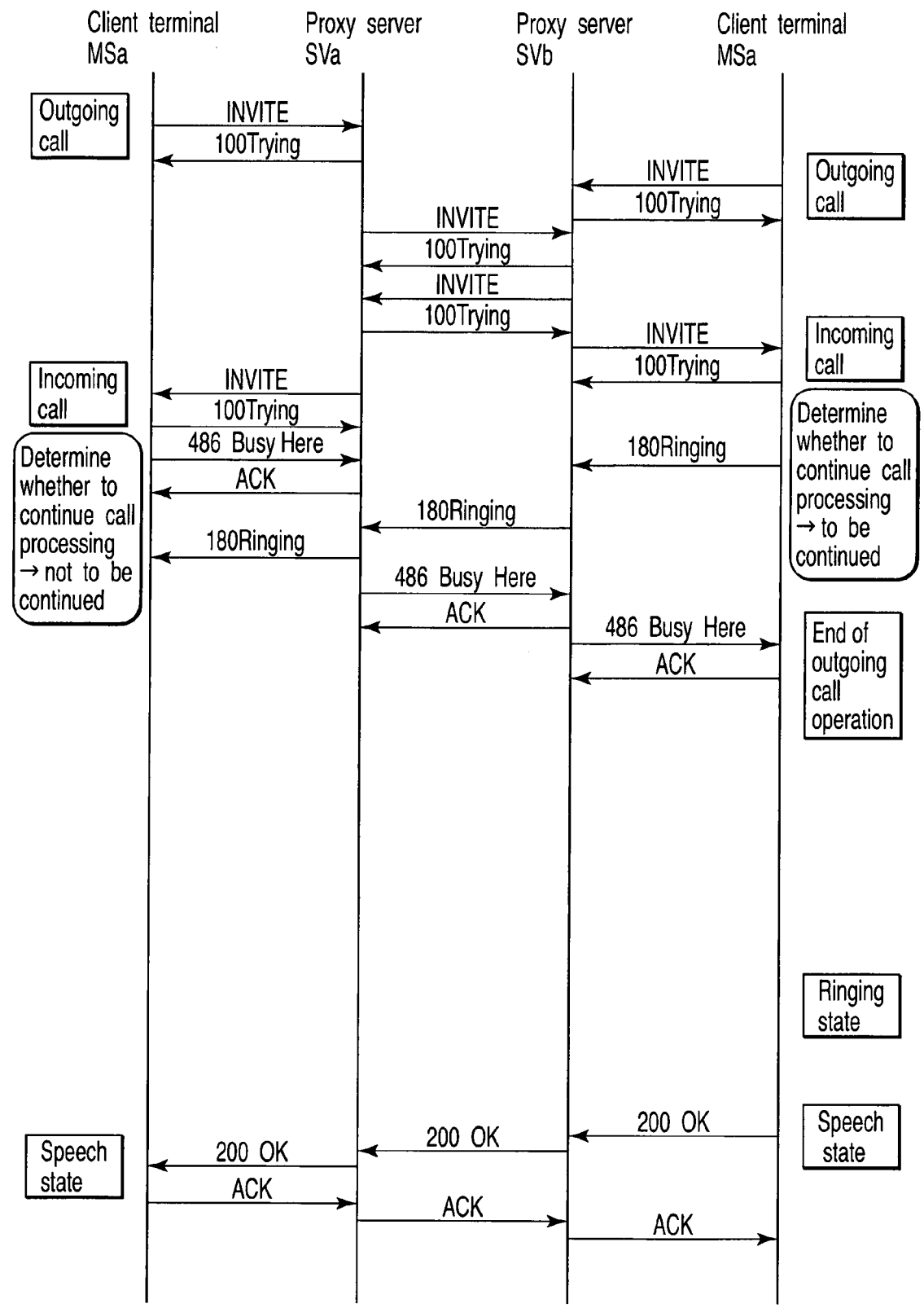
FIG. 8 is a view showing a call establishment sequence in a case wherein both client terminals have transmitted outgoing calls at almost the same time.

Upon transmitting an INVITE message, the client terminals MSa and MSb monitor the arrival of another INVITE message addressed to them respectively before receiving an INVITE response message of status code 180 Ringing corresponding to the transmitted INVITE message. Upon receiving another INVITE message, each client terminal executes incoming call control operation. FIGS. 5 and 6 are flowcharts showing a contents control procedure for this operation. FIG. 8 is a view showing a call establishment sequence between the client terminals MSa and MSb.

Upon receiving an INVITE message, in each of the client terminals MSa and MSb, the SIP message transmission/reception module 31 analyzes the header of the received INVITE message. The SIP message transmission/reception module 31 forwards the header analysis result to the call processing control module 322 in the SIP state control module 32 (step 5a to step 5b).

In step 5c, the call processing control module 322 obtains the current state of the terminal. If the current state is the standby state, the call processing control module 322 executes a normal incoming call control procedure. In the case that the current state of the terminal is the outgoing call state, the process advances to step 5d to transfer the source address information of the received INVITE message to the source identification module 36 and to issue a request to identify the source address. The source identification module 36 compares the source address information of the received INVITE with the destination address information of the transmitted INVITE message stored in the message information store module 38, and notifies the SIP state control module 32 of the comparison result.

In step 5e, the call processing control module 322 in the SIP state control module 32 determines, on the basis of the comparison result notified from the source identification module 36, whether the destination address coincides with the source address. Upon detecting that the destination address does not match the source address, the call processing control module 322 generates INVITE response message information of status code 486 Busy Here indicating the busy state, and the SIP message transmission/reception module 31 returns the INVITE response message to the source address of the received INVITE message.

If the destination address matches the source address, the call processing control module 322 in the SIP state control module 32 transfers the outgoing call time inserted in the Date header field of the received INVITE message to the continuation determination module 37, and issues a request to determine the continuation of call processing in step 6a. The continuation determination module 37 compares the outgoing call time ta inserted in the Date header field of the transmitted INVITE stored in the message information store module 38 with the outgoing call time tb of the received INVITE message, and notifies the SIP state control module 32 of the comparison result.

Upon receiving the comparison result, the call processing control module 322 in the SIP state control module 32 determines in step 6b whether the outgoing call time ta is earlier than the outgoing call time tb. If the outgoing call time ta is earlier than the outgoing call time tb, the client terminal MSa determines in step 6e that priority should be given to the outgoing call operation, and decides not to continue call processing for the incoming call as shown in FIG. 8. In step 6f, the client terminal generates INVITE response message information of status code 486 Busy Here indicating the busy state, and the SIP message transmission/reception module 31 returns the INVITE response message to the source address of the received INVITE message.

Upon transmitting the INVITE response message indicating the busy state, the client terminal monitors, in step 6g, the reception of an INVITE response message of status code 180 Ringing indicating an incoming call response to the transmitted INVITE message. Upon receiving the INVITE response message, the client terminal continues the call establishment procedure of the outgoing call.

Assume that the outgoing call time ta of the transmitted INVITE message is later than the outgoing call time tb of the received INVITE message. In this case, the call processing control module 322 in the SIP state control module 32 determines that priority should be given to the outgoing call operation of the remote terminal, and decides to continue call processing for the incoming call operation (step 6h). As shown in FIG. 8, the client terminal MSb generates an INVITE response message of status code 180 Ringing for the incoming call in response to the received INVITE message, and the SIP message transmission/reception module 31 returns the INVITE response message to the source address of the received INVITE message in step 6i.

Upon transmitting the INVITE response message for the incoming call, the call processing control module 322 monitors, in step 6j, the reception of INVITE response message information of status code 486 Busy Here indicating the busy state with respect to the transmitted INVITE message. Upon receiving the INVITE response message, the call processing control module 322 terminates the outgoing call control and executes a call establishment procedure accompanying the subsequent incoming call operation.

Assume that the outgoing call time ta of the transmitted INVITE message coincides with the outgoing call time tb of the received INVITE message. In this case, the SIP state control module 32 shifts to step 6c to transfer a random number Rb inserted in the CALL-Rand header field of the received INVITE message to the continuation determination module 37, and issues a request to determine the continuation of call processing. The continuation determination module 37 compares the random number Ra inserted in the Call-rand header field of the transmitted INVITE message stored in the message information store module 38 with the random number Rb of the received INVITE message, and notifies the SIP state control module 32 of the comparison result.

Upon receiving the comparison result, the call processing control module 322 of the SIP state control module 32 determines in step 6d whether the random number Ra is larger than the random number Rb. If the random number Rb of the received INVITE message is larger than or equal to the random number Ra of the transmitted INVITE message, the process shifts to step 6e to determine that priority should be given to the outgoing call operation of the terminal and to decide not to continue the call processing for the subsequent incoming call operation, as in the case wherein the outgoing call time ta is earlier than the time tb. In step 6f, the call processing control module 322 generates an INVITE response message of status code 486 Busy Here indicating the busy state and the SIP message transmission/reception module 31 returns the INVITE response message to the source address of the received INVITE message.

If the random number Rb of the transmitted INVITE message is smaller than the random number Ra of the received INVITE message, the process shifts to step 6h to determine that priority should be given to the outgoing call operation of the remote terminal and to decides to continue the call processing for the subsequent incoming call operation, as in the case wherein the outgoing call time ta is later than the time tb. In step 6i, the call processing control module 322 generates an INVITE response message of status code 180 Ringing for the incoming call in response to the received INVITE message, and the SIP message transmission/reception module 31 returns the INVITE response message to the source address of the received INVITE message.

As described above, according to this embodiment, when an INVITE message is transmitted as an outgoing call request message from a client terminal, the client terminal inserts an outgoing call time in the Date header field of the INVITE message, and also inserts a random number in the Call-Rand header field of the INVITE message.

When a given client terminal receives an INVITE message addressed to it during outgoing call operation, the terminal compares the destination address information of the transmitted INVITE message with the source address information of the received INVITE message, and verifies whether the destination address matches the source address. If the destination address matches the source address, the terminal compares the outgoing call time inserted in the Date header field of the transmitted INVITE message with the outgoing call time of the received INVITE message to determine which one of the outgoing call times is earlier. If the outgoing call time of the transmitted INVITE message is earlier, the terminal determines not to continue the subsequent call processing for the incoming call operation and returns an INVITE response message of status code 486 Busy Here to the source address of the received INVITE message. In contrast to this, if the outgoing call time of the transmitted INVITE message is later, the terminal determines to continue the subsequent call processing for the incoming call operation and returns an INVITE response message of status code 180 Ringing indicating an incoming call response to the source address of the received INVITE message.

Even if, therefore, a given terminal transmits an INVITE message as an outgoing call request first, and then receives another INVITE message addressed to it before receiving an INVITE response message of status code 180 Ringing indicating an incoming call response to the transmitted INVITE message, i.e., two outgoing call requests are congested during the same period, the terminal continues call processing upon giving priority to the INVITE message with the earlier outgoing call time. This prevents a response to an INVITE message from being set in the busy state unconditionally, and can improve the probability of establishing a session and performing voice communication.

According to this embodiment, if the outgoing call time of a terminal coincides with the outgoing call time of another terminal, the terminal compares the random number in the INVITE message which the terminal has transmitted with the random number in the INVITE message which another terminal has transmitted. Priority is given to the INVITE message with the larger random number, and the terminal continues call processing with respect to this INVITE message. For this reason, even if the outgoing call times coincide with each other, the terminal can continue call processing upon giving priority to one INVITE message on the basis of the magnitude relationship between random numbers. This can further improve the probability of establishing a session and allowing voice communication.

Figure 9:
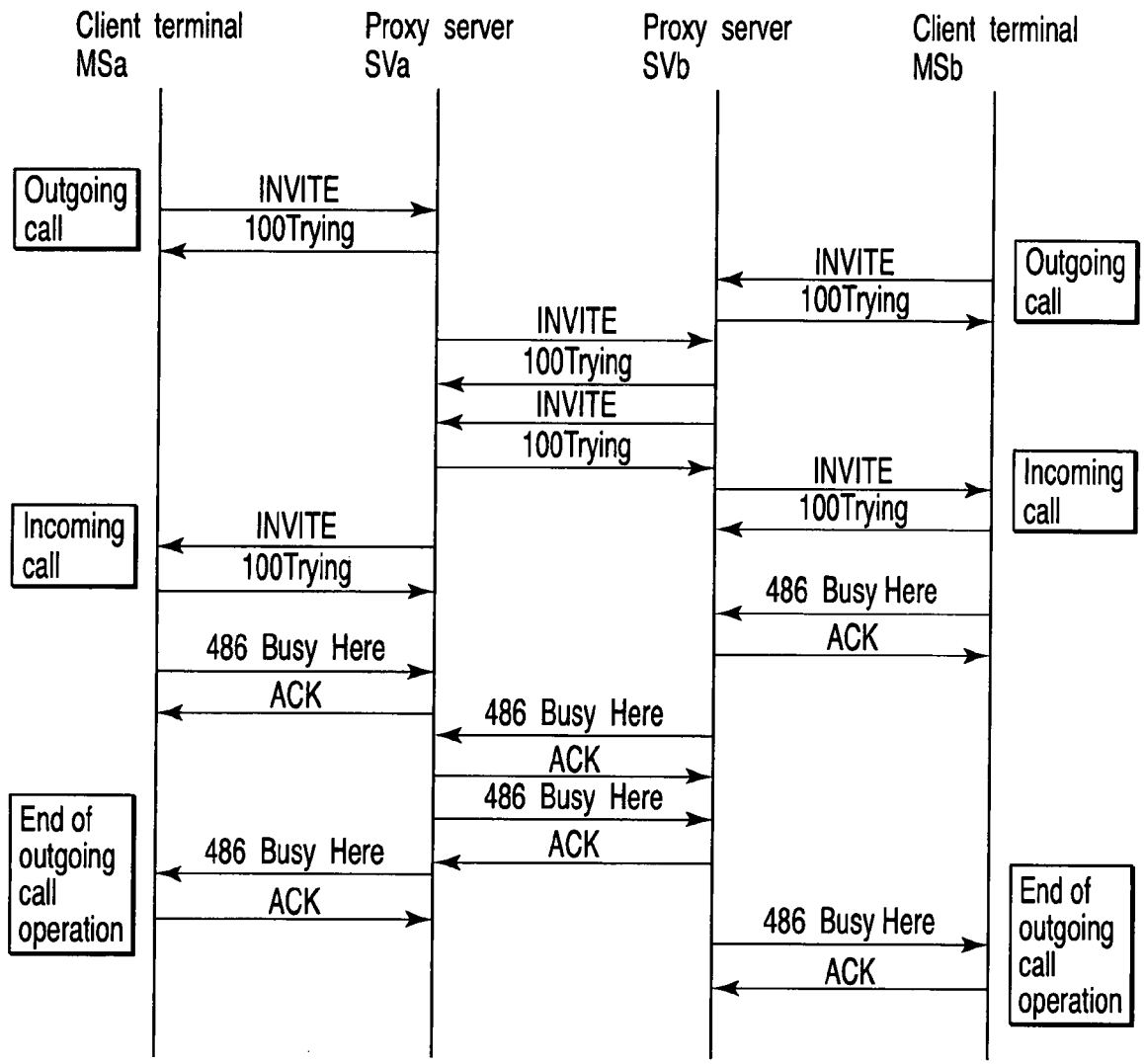
FIG. 9 is a view showing a call establishment sequence in a case wherein no call processing continuation determination is performed.

Assume that the above call processing continuation determination is not performed. In this case, as shown in FIG. 9, upon receiving an INVITE message addressed to each of the client terminals MSa and MSb, both terminals return INVITE response messages of status code 486 Busy Here indicating the busy state unconditionally to each other. For this reason, both the client terminals MSa and MSb terminate call processing at the time of outgoing call operation. Therefore, each user cannot make voice communication, and must perform outgoing call operation again.

Note that the present invention is not limited to the above embodiment. For example, the above embodiment has exemplified the case wherein the continuation of call processing is determined on the basis of both outgoing call time information and random number information. However, it suffices to determine the continuation of call processing on the basis of only outgoing call time information or random number information. In addition, even if the continuation of call processing is determined on the basis of both outgoing call time information and random number information, it suffices to perform determination first by using random numbers and then perform determination on the basis of outgoing call time information if the random numbers coincide with each other. Furthermore, it suffices to give higher priority to call processing with a smaller random number in determining the magnitude relationship between the random numbers.

In addition, it suffices to transmit an INVITE message with its header containing information indicating urgency or information indicating a position and allow determination of the continuation of call processing on the basis of the information indicating the urgency or the information indicating the position.

Although this embodiment inserts information indicating the priority of outgoing call operation in the header of an INVITE message, it suffices to insert text data in the body of an INVITE message. That is, it suffices to use any transmission form of information indicating the priority of outgoing call operation as long as a receiving terminal can extract the information indicating the priority of outgoing call operation from the INVITE message.

Furthermore, the voice communication terminal is not limited to a cell phone terminal and may be an SIP-compatible IP portable terminal such as a PDA (Personal Digital Assistant) or a notebook type personal computer, or an SIP-compatible personal computer or a fixed IP terminal such as a fixed wired telephone set. In addition, the above embodiment can be variously modified and executed without departing from the gist of the present invention concerning the arrangement of the voice communication terminal, the call establishment control procedure, the control contents, and the like.

Note that the present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from the all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voice communication terminal which establishes a session and performs voice communication with a communication partner terminal through a packet communication network, comprising:
   a transmission module configured to generate and transmit a first outgoing call request message containing information indicating a source address and a destination address and information indicating a priority of outgoing call operation;
   a comparison module configured to, when a second outgoing call request message addressed to the terminal is received before an incoming call response message with respect to the first outgoing call request message is received from the destination terminal after the first outgoing call request message is transmitted, compares the information indicating the priority of outgoing call operation contained in the second outgoing call request message with the information indicating the priority of outgoing call operation contained in the first outgoing call request message transmitted by the terminal; and
   a control module configured to execute an incoming call response procedure corresponding to the second outgoing call request message when the priority of outgoing call operation in the second outgoing call request message is higher as the result of the comparison between the priorities of outgoing call operation, and to execute an outgoing call control procedure following the first outgoing call request message when the priority of outgoing call operation in the first outgoing call request message is higher;
   wherein the transmission module contains at least one of an outgoing time and a random number as information indicating the priority of outgoing call operation in the first outgoing call message.

2. The terminal according to claim 1, wherein the transmission module contains both the outgoing call time as information indicating the priority of outgoing call operation in the first outgoing call request message and the random number as information indicating the priority of outgoing call operation in the first outgoing call message, and
   the control module comprises a module configured to execute an incoming call response procedure corresponding to the second outgoing call request message when the outgoing call time contained in the second outgoing call request message is earlier or when the random number of the first outgoing call message indicates a low priority, and
   a module configured to execute an outgoing call control procedure following the first outgoing call request message when the outgoing call time contained in the first outgoing call request message is later or when the random number of the first outgoing call message indicates a high priority.

3. The terminal according to claim 1, wherein the transmission module contains a first random number as information indicating the priority of outgoing call operation in the first outgoing call request message and a second random number as information indicating the priority of outgoing call operation in the second outgoing call request message, and
   the control module comprises a module configured to execute an incoming call response procedure corresponding to the second outgoing call request message when the second random number contained in the second outgoing call request message is larger or equal to the first random number of the first outgoing call request message, and
   a module configured to execute an outgoing call control procedure following the first outgoing call request message when the first random number contained in the first outgoing call request message is larger than the second random number contained in the second outgoing call request message.

4. The terminal according to claim 1, wherein
   the transmission module contains an outgoing call time and a first random number as information indicating the priority of outgoing call operation in the first outgoing call request message and a second random number as information indicating the priority of outgoing call operation in the second outgoing call request message, and
   the control module comprises a module configured to execute an incoming call response procedure corresponding to the second outgoing call request message when the outgoing call time contained in the second outgoing call request message is earlier or when the random number of the first outgoing call message indicates a low priority, and
   a module configured to execute an outgoing call control procedure following the first outgoing call request message when the outgoing call time contained in the first outgoing call request message is later or when the random number of the first outgoing call message indicates a high priority.

5. The terminal according to claim 4, wherein
   the control module further comprises a module configured to, when the outgoing call time contained in the second outgoing call request message is equal to the outgoing call time contained in the first outgoing call request message, execute an incoming call response procedure corresponding to the second outgoing call request message when the second random number contained in the second outgoing call request message is larger than or equal to the first random number contained in the first outgoing call request message on the basis of the result of comparison between the second random number contained in the second outgoing call request message and the first random number contained in the first outgoing call request message, and a module configured to execute an outgoing call control procedure following the first outgoing call request message when the random number contained in the first outgoing call request message is smaller.

6. A voice communication terminal which establishes a session and performs voice communication with a communication partner terminal through a packet communication network, comprising:

a transmission module configured to generate and transmit a first outgoing call request message containing information indicating a source identification information and a destination identification information and information indicating a priority of outgoing call operation;

a comparison module configured to, when a second outgoing call request message addressed to the terminal is received before an incoming call response message with respect to the first outgoing call request message is received from the destination terminal after the first outgoing call request message is transmitted, compares the information indicating the priority of outgoing call operation contained in the second outgoing call request message with the information indicating the priority of outgoing call operation contained in the first outgoing call request message transmitted by the terminal; and a control module configured to execute an incoming call response procedure corresponding to the second outgoing call request message when the priority of outgoing call operation in the second outgoing call request message is higher as the result of the comparison between the priorities of outgoing call operation, and to execute an outgoing call control procedure following the first outgoing call request message when the priority of outgoing call operation in the first outgoing call request message is higher;

wherein the transmission module contains at least one of an outgoing time and a random number as information indicating the priority of outgoing call operation in the first outgoing call message.

7. The terminal according to claim 6, wherein the transmission module contains both the outgoing call time as information indicating the priority of outgoing call operation in the first outgoing call request message and the random number as information indicating the priority of outgoing call operation in the first outgoing call message, and the control module comprises a module configured to execute an incoming call response procedure corresponding to the second outgoing call request message when the outgoing call time contained in the second outgoing call request message is earlier or when the random number of the first outgoing call message indicates a low priority, and a module configured to execute an outgoing call control procedure following the first outgoing call request message when the outgoing call time contained in the first outgoing call request message is later or when the random number of the first outgoing call message indicates a high priority.

8. The terminal according to claim 6, wherein the transmission module contains a first random number as information indicating the priority of outgoing call operation in the first outgoing call request message and a second random number as information indicating the priority of outgoing call operation in the second outgoing call request message, and the control module comprises a module configured to execute an incoming call response procedure corresponding to the second outgoing call request message when the second random number contained in the second outgoing call request message is larger or equal to the first random number of the first outgoing call request message, and a module configured to execute an outgoing call control procedure following the first outgoing call request message when the first random number contained in the first outgoing call request message is larger than the second random number contained in the second outgoing call request message.

9. The terminal according to claim 6, wherein the transmission module contains an outgoing call time and a first random number as information indicating the priority of outgoing call operation in the first outgoing call request message and a second random number as information indicating the priority of outgoing call operation in the second outgoing call request message, and the control module comprises a module configured to execute an incoming call response procedure corresponding to the second outgoing call request message when the outgoing call time contained in the second outgoing call request message is earlier or when the random number of the first outgoing call message indicates a low priority, and a module configured to execute an outgoing call control procedure following the first outgoing call request message when the outgoing call time contained in the first outgoing call request message is later or when the random number of the first outgoing call message indicates a high priority.

10. The terminal according to claim 9, wherein the control module further comprises a module configured to, when the outgoing call time contained in the second outgoing call request message is equal to the outgoing call time contained in the first outgoing call request message, execute an incoming call response procedure corresponding to the second outgoing call request message when the second random number contained in the second outgoing call request message is larger than or equal to the first random number contained in the first outgoing call request message on the basis of the result of comparison between the second random number contained in the second outgoing call request message and the first random number contained in the first outgoing call request message, and a module configured to execute an outgoing call control procedure following the first outgoing call request message when the random number contained in the first outgoing call request message is smaller.

11. A cellular phone which establishes a session and performs voice communication with a communication partner cellular phone through a packet communication network, comprising:

a transmission module configured to generate and transmit a first outgoing call request message containing information indicating a source address and a destination address and information indicating a priority of outgoing call operation;

a comparison module configured to, when a second outgoing call request message addressed to the cellular phone is received before an incoming call response message with respect to the first outgoing call request message is received from the destination cellular phone after the first outgoing call request message is transmitted, compares the information indicating the priority of outgoing call operation contained in the second outgoing call request message with the information indicating the priority of outgoing call 20 operation contained in the first outgoing call request message transmitted by the cellular phone; and a control module configured to execute an incoming call response procedure corresponding to the second outgoing call request message when the priority of outgoing call operation in the second outgoing call request message is higher as the result of the comparison between the priorities of outgoing call operation, and to execute an outgoing call control procedure following the first outgoing call request message when the priority of outgoing call operation in the first outgoing call request message is higher;

wherein the transmission module contains at least one of an outgoing time and a random number as information indicating the priority of outgoing call operation in the first outgoing call message.

12. The cellular according to claim 11, wherein
both the outgoing call time as information indicating the priority of outgoing call operation in the first outgoing call request message and the random number as information indicating the priority of outgoing call operation in the first outgoing call message, and the control module comprises a module configured to execute an incoming call response procedure corresponding to the second outgoing call request message when the outgoing call time contained in the second outgoing call request message is earlier or when the random number of the first outgoing call message indicates a low priority, and a module configured to execute an outgoing call control procedure following the first outgoing call request message when the outgoing call time contained in the first outgoing call request message is later or when the random number of the first outgoing call message indicates a high priority.

13. The cellular phone according to claim 11, wherein
the transmission module contains a first random number as information indicating the priority of outgoing call operation in the first outgoing call request message and a second random number as information indicating the priority of outgoing call operation in the second outgoing call request message, and the control module comprises a module configured to execute an incoming call response procedure corresponding to the second outgoing call request message when the second random number contained in the second outgoing call request message is larger or equal to the first random number of the first outgoing call request message, and a module configured to execute an outgoing call control procedure following the first outgoing call request message when the first random number contained in the first outgoing call request message is larger than the second random number contained in the second outgoing call request message.

14. A cellular phone according to claim 11, wherein
the transmission module contains an outgoing call time and a first random number as information indicating the priority of outgoing call operation in the first outgoing call request message and a second random number as information indicating the priority of outgoing call operation in the second outgoing call request message, and the control module comprises a module configured to execute an incoming call response procedure corresponding to the second outgoing call request message when the outgoing call time contained in the second outgoing call request message is earlier or when the random number of the first outgoing call message indicates a low priority, and a module configured to execute an outgoing call control procedure following the first outgoing call request message when the outgoing call time contained in the first outgoing call request message is later or when the random number of the first outgoing call message indicates a high priority.

15. A cellular phone according to claim 14, the control module further comprises a module configured to, when the outgoing call time contained in the second outgoing call request message is equal to the outgoing call time contained in the first outgoing call request message, execute an incoming call response procedure corresponding to the second outgoing call request message when the second random number contained in the second outgoing call request message is larger than or equal to the first random number contained in the first outgoing call request message on the basis of the result of comparison between the second random number contained in the second outgoing call request message and the first random number contained in the first outgoing call request message, and a module configured to execute an outgoing call control procedure following the first outgoing call request message when the random number contained in the first outgoing call request message is smaller.

* * * * *